(12) United States Patent
LaRosa et al.

(10) Patent No.: US 7,085,246 B1
(45) Date of Patent: Aug. 1, 2006

(54) METHOD AND APPARATUS FOR ACQUISITION OF A SPREAD-SPECTRUM SIGNAL

(75) Inventors: Christopher Peter LaRosa, Lake Zurich, IL (US); Brian David Storm, Round Lake Beach, IL (US); Michael John Carney, Woodstock, IL (US); Christopher Becker, Palatine, IL (US); Tracie Ann Schirtzinger, Woodstock, IL (US); Dave Steckl, Elkhorn, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/558,121

(22) Filed: Apr. 25, 2000

Related U.S. Application Data

(63) Continuation-in-part of application No. 09/314,819, filed on May 19, 1999, now Pat. No. 7,031,271.

(51) Int. Cl.
*G08C 7/00* (2006.01)
*H04Q 7/38* (2006.01)

(52) U.S. Cl. .................. 370/311; 370/335; 370/441
(58) Field of Classification Search ............. 370/328, 370/335, 342, 441; 375/142, 150
See application file for complete search history.

(56) References Cited

U.S. PATENT DOCUMENTS

| | | | |
|---|---|---|---|
| 5,392,287 A | 2/1995 | Tiedemann, Jr. et al. | |
| 5,491,718 A | 2/1996 | Gould et al. | |
| 5,577,025 A | 11/1996 | Skinner et al. | |
| 5,596,571 A | 1/1997 | Gould et al. | |
| 5,644,591 A | 7/1997 | Sutton | |
| 5,654,979 A * | 8/1997 | Levin et al. ............... | 375/142 |
| 5,677,927 A | 10/1997 | Fullerton et al. | |
| 5,710,768 A | 1/1998 | Ziv et al. | |
| 5,748,687 A | 5/1998 | Ozluturk | |
| 5,761,211 A * | 6/1998 | Yamaguchi et al. ........ | 714/707 |
| 5,764,687 A | 6/1998 | Easton | |
| 5,790,589 A | 8/1998 | Hutchison, IV et al. | |
| 5,805,648 A * | 9/1998 | Sutton ....................... | 375/367 |
| 5,822,384 A | 10/1998 | Thebault et al. | |
| 5,825,835 A | 10/1998 | Kingston et al. | |
| 5,867,527 A | 2/1999 | Ziv et al. | |
| 5,872,774 A | 2/1999 | Wheatley, III et al. | |
| 5,881,058 A * | 3/1999 | Chen ......................... | 370/335 |
| 5,910,944 A | 6/1999 | Callicotte et al. | |
| 5,956,367 A * | 9/1999 | Koo et al. .................. | 375/149 |
| 5,960,048 A * | 9/1999 | Haartsen .................... | 375/366 |
| 6,005,889 A * | 12/1999 | Chung et al. ............... | 375/140 |
| 6,016,312 A | 1/2000 | Storm et al. | |

(Continued)

FOREIGN PATENT DOCUMENTS

EP 0758768 A2 2/1997

(Continued)

*Primary Examiner*—Doris H. To
*Assistant Examiner*—Ahmed Elallam
(74) *Attorney, Agent, or Firm*—Randall S. Vaas; Lawrence J. Chapa

(57) ABSTRACT

An apparatus for acquiring a pseudo-random (PN) sequence timing for a code division multiple access (CDMA) radio-telephone. A buffer stores samples of representations of at least one pilot signal. A correlator coupled to the buffer is operable to correlate at least a portion of the samples with a PN sequence at each of a plurality of different PN offsets to produce corresponding correlation energies. A controller coupled to the correlator interrupts the correlator as soon as the PN sequence at a particular PN offset produces a correlation energy at least equal to an energy threshold.

27 Claims, 7 Drawing Sheets

U.S. PATENT DOCUMENTS

| | | | |
|---|---|---|---|
| 6,069,915 A | 5/2000 | Hulbert | |
| 6,094,450 A * | 7/2000 | Shockey | 375/141 |
| 6,141,374 A * | 10/2000 | Burns | 375/152 |
| 6,144,649 A * | 11/2000 | Storm et al. | 370/335 |
| 6,144,691 A * | 11/2000 | Kenney | 375/130 |
| 6,191,738 B1 * | 2/2001 | Pfeil et al. | 342/457 |
| 6,243,561 B1 * | 6/2001 | Butler et al. | 340/7.42 |
| 6,275,186 B1 * | 8/2001 | Kong | 342/363 |
| 6,331,998 B1 * | 12/2001 | Lin et al. | 375/143 |
| 6,363,060 B1 * | 3/2002 | Sarkar | 370/342 |
| 6,421,371 B1 * | 7/2002 | Sourour et al. | 375/142 |
| 6,567,460 B1 * | 5/2003 | Tak et al. | 375/140 |
| 6,606,349 B1 * | 8/2003 | Kudhrethaya et al. | 375/150 |
| 6,628,699 B1 * | 9/2003 | Ramberg et al. | 375/148 |
| 6,990,091 B1 * | 1/2006 | Sarkar | 370/342 |
| 6,996,162 B1 * | 2/2006 | Hosur et al. | 375/150 |

FOREIGN PATENT DOCUMENTS

| | | |
|---|---|---|
| FR | 2 722 045 A1 | 6/1994 |
| GB | 2 315 647 A | 7/1996 |
| GB | 2315194 A | 1/1998 |
| WO | WO 96/41432 | 6/1995 |
| WO | WO 96/35268 | 11/1996 |
| WO | WO 97/01227 | 1/1997 |
| WO | WO 97/14055 | 4/1997 |
| WO | WO 99/30433 | 6/1999 |
| WO | WO 99/67895 | 12/1999 |

* cited by examiner

METHOD AND APPARATUS FOR ACQUISITION OF A SPREAD-SPECTRUM SIGNAL

CROSS REFERENCE TO RELATED APPLICATION

This application is a continuation-in-part of application Ser. No. 09/314,819, filed May 19, 1999, now U.S. Pat. No. 7,031,271 and entitled "METHOD OF AND APPARTUS FOR ACTIVATING A SPREAD-SPECTRUM RADIO-TELEPHONE."

FIELD OF THE INVENTION

This invention generally relates to reducing power consumption in portable radios such as radiotelephones. More specifically, this invention relates to an apparatus and method for activating a radiotelephone receiver in a spread-spectrum multiple access radiotelephone system.

BACKGROUND OF THE INVENTION

In a radiotelephone system, the portable radiotelephone is configured for radio communication with one or more remote base stations. To save power and increase battery life of the radiotelephone, the radiotelephone system can operate in a slotted paging mode. During slotted paging mode operation, the radiotelephone does not continuously monitor a paging channel. The radiotelephone only monitors the paging channel at predetermined times. During times when the radiotelephone is not monitoring the paging channel, the radiotelephone "sleeps" in a low power mode by disabling certain radiotelephone circuitry, thereby reducing power consumption.

Slotting paging mode is critical to the battery life of portable radiotelephones. Thus, the goal of slotted paging mode operation is to reduce the on time of the radio to a minimum and to disable as much of the radio as possible during sleep periods.

When recovering from a sleep period, or more generally when activating the radiotelephone receiver, the radiotelephone must acquire a radio frequency (RF) link with a base station in the radiotelephone system. Link acquisition and synchronization, as well as other operations such as communication protocols, are defined in an air interface specification. One example of such a specification is the Telecommunications Industry Association/Electronic Industry Association (TIA/EIA) Interim Standard IS-95, "Mobile Station-Base Station Compatibility Standard for Dual-Mode Wide-band Spread Spectrum Cellular System" (IS-95). IS-95 defines a direct sequence code division multiple access (DS-CDMA or CDMA) radiotelephone system. Other air interface specifications exist for wireless local loop (WLL) radiotelephone systems, and new air interface specifications are being proposed for advanced wide-band spread spectrum radiotelephone systems (commonly referred to as third generation cellular telephone systems).

Part of the process for a radiotelephone to acquire an RF link with a base station is the radiotelephone finding an appropriate signal that a base station transmits and then synchronizing to the transmitted signal. Synchronization to the transmitted signal is necessary whether the CDMA system is synchronous (e.g. all base stations are synchronized to a common timing reference) or conversely asynchronous (e.g. all base stations are not synchronized to a common timing reference).

For example, in the IS-95 system, synchronization of a radiotelephone with a base station involves the radiotelephone generating local pseudo-random noise (PN) sequence and aligning that PN sequence with the system PN sequence. This is accomplished through the acquisition of a pilot signal transmitted by the base station. The radiotelephone thus contains a sequence generator to generate the PN sequence. The radiotelephone uses a searcher receiver or other mechanism to align the locally generated PN sequence to the PN sequence of the pilot signal transmitted by the base station. Once the pilot signal has been acquired, the radiotelephone acquires a synchronization signal and a paging signal, and the radiotelephone can then correctly demodulate traffic channels and establish full duplex link with the base station.

In slotted paging mode, a radiotelephone periodically checks for messages from base stations. The radiotelephone must decode one or more frames of data every T seconds. For example, in the IS-95 CDMA system, T is calculated by $T=1.28*2^i$ seconds, where i is typically set to 0 or 1. In order to extend radiotelephone battery life, part of the circuitry of the radiotelephone is put to sleep between slotted paging messages (e.g. a clock signal is gated off to circuitry being put to sleep).

FIG. 1 is a timing diagram showing how the prior art radiotelephone activates while operating in the slotted paging mode. The PN sequence timing is shown on time axis 400, and the corresponding radiotelephone event is shown on time axis 401.

Time axis 400 shows that a PN roll boundary occurs at time 404. In spread spectrum systems, the PN sequence is usually of a finite length that repeats itself after cycling through the entire sequence; the PN roll boundary marks the starting point of the PN sequence. For example, in the IS-95 system, the PN roll boundary occurs once every 26.66 msec.

Time axis 400 also shows that a frame boundary occurs at time 406. In the IS-95 system, the 80 msec frame boundary occurs once every 80 msec and is aligned with the PN roll boundary. A paging message begins on an 80 msec frame boundary.

Several radiotelephone events must take place before the frame boundary in order for the radiotelephone to demodulate and decode a paging message. Prior to time 402, the prior art radiotelephone is in a sleep state wherein a clock to the receiver modem circuitry is gated off. When the radiotelephone initially entered the sleep state, the microprocessor stored the current PN sequence state. The radiotelephone then remains in the sleep state for a predetermined amount of time, and the microprocessor keeps track of the sleep time to produce an awake state when the radiotelephone is brought out of the sleep mode.

Just prior to time 402, the microprocessor programs the awake state to the receiver modem and reapplies a clock signal to the receiver modem. This awake state represents a best estimation by the microprocessor of the state of the PN sequence when the radiotelephone is brought out of sleep mode. The awake state is thereafter updated real time in an attempt to track the PN sequence.

In prior art spread-spectrum radiotelephones, approximately 90% of the receiver modem circuitry is gated on and enabled at this point. Thus, within the receiver modem unit, clock signals are applied to all of the demodulation branches, the searcher receiver, and associated timing circuitry At time 402, a WAKE event occurs, and a WAKE pulse loads identical state information into the searcher receiver and the demodulation branches, thereby synchronizing them relative to one another. The searcher unit then searches received signals until a suitable high-energy ray is found. Once a suitable pilot signal is found, the timing of the searcher receiver and all of the demodulation branches are slewed so that their timing matches the PN sequence communicated through the pilot signal. Slewing is a process that involves advancing, delaying, or holding the internally generated PN sequence relative to the received PN sequence. This establishes a timing reference.

In a typical prior art CDMA radiotelephone, the radiotelephone requires approximately 30 msec to acquire a pilot signal and synchronize the searcher receiver and the demodulation branches to the PN sequence; this is marked as time duration 410. Therefore, the WAKE event must occur at least 30 msec before the SLAM event which is to occur at the PN roll boundary at time 404. Since the clocks to the searcher timing unit, the branch timing unit, and the system timing unit have been gated on since the WAKE event, the important timing relationships between them are continually maintained. In addition, during this approximately 30 msec period, approximately 90% of the receiver modem circuitry is enabled, including all non-searcher receiver circuitry within the receiver modem.

Prior art radiotelephone hardware is configured to initiate a SLAM event at the PN roll boundary (e.g. at time 404). A SLAM event is defined as the synchronization of the system timing unit of the radiotelephone receiver modem to the pilot signal PN sequence. The system timing unit controls the timing of the entire radiotelephone receiver modem and directs the operation of the receiver modem. Thus, for a SLAM the microprocessor directs the system timing unit of the receiver modem to synchronize to the timing of the demodulation branches and the searcher receiver.

The SLAM event occurs at time 404. During the 26.6 msec time duration 412, 90% of the receiver modem circuitry is active. At time 406, the demodulator branches generate de-interleaver data and decode the paging message. The receiver modem finishes decoding the paging message at time 408, and the time for this is typically 35 msec, as marked by time duration 414.

In addition to the radiotelephone awaking at predetermined times while operating in a slotted paging mode, the radiotelephone may also be required to wake up to process or respond to other events occurring either synchronously or asynchronously in the radiotelephone. One example of an asynchronous event is a user input, such as the key press of the keypad of the radiotelephone.

Thus it can be seen that the prior art radiotelephone is inefficient for operation in the slotted paging mode. Reduced power consumption of the radiotelephone is a critical performance objective. The reduced power consumption increases radiotelephone battery life, thereby increasing the amount of time that the radiotelephone can operate without having to re-charge the battery. Accordingly, there is a need for a method and apparatus for efficiently and quickly enabling a spread spectrum radiotelephone during operation in slotted paging mode. There is a further need for a method and apparatus for efficiently activating a spread spectrum radiotelephone in response to synchronous and asynchronous events (e.g. initial activation of the radiotelephone).

In addition, the searcher receiver must locate spread spectrum signals having sufficient energy during an initial acquisition mode. Initial acquisition mode is, for example, when a radiotelephone is initially powered on and needs to obtain initial PN sequence timing. In current radiotelephones, users complain of long acquisition times (e.g. a long wait time before a user can use the radiotelephone after turning the radiotelephone on).

Even after the searcher receiver has determined initial PN sequence timing by finding at least one pilot signal ray of suitable signal strength, the searcher receiver must continually search for new signals since multipath conditions, fading conditions, and the location of the radiotelephone constantly change. In fact, a high percentage of dropped calls can occur because the available pilot signals are changing so fast that the searcher receiver of the radiotelephone cannot track the changes.

Finally, new systems requirements might require what is termed mobile assisted hard handoff (MAHHO). This requires the radiotelephone to break a communication link with a first base station, tune to another frequency, look for pilots, return to the original frequency, and then reestablish the communication link with the first base station. The faster this can be done, the more robust the MAHHO will be. Thus, there is a need for a reduction in the time required to acquire a suitable pilot signal of sufficient energy, a minimization of radiotelephone current drain, a reduction in microprocessor required interaction in pilot signal searching and acquisition, and an increase in searcher receiver flexibility for MAHHO.

DETAILED DESCRIPTION OF PREFERRED EMBODIMENTS

Figure 2:
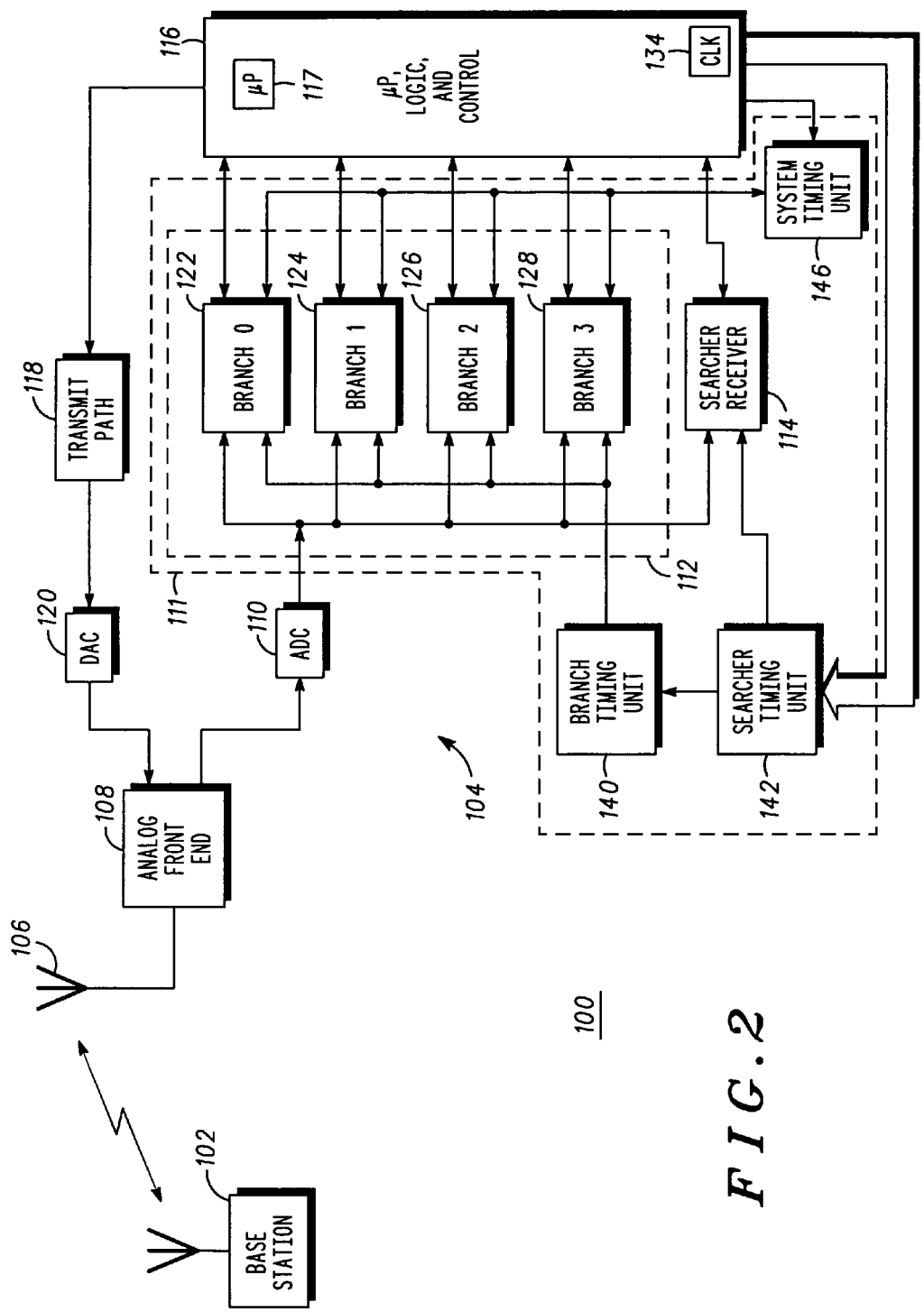
FIG. 2 is a block diagram of a wireless communication system incorporating a radiotelephone.

FIG. 2 shows a communication system 100 that includes a plurality of base stations, such as base station 102, configured for radio communication with one or more mobile stations such as radiotelephone 104. The radiotelephone 104 is configured to receive and transmit spread spectrum signals to communicate with the plurality of base stations, including base station 102. In the illustrated embodiment, the communication system 100 operates as a direct sequence code division multiple access (DS-CDMA) system. An example of such a system is outlined in TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other DS-CDMA systems or frequency hopping spread spectrum systems.

The base station 102 transmits various spread spectrum signals, such as an information signal on a traffic channel, to the radiotelephone 104. The symbols comprising the information signal are coded using a Walsh code in a process known as Walsh covering. Each mobile station such as the radiotelephone 104 is assigned a unique Walsh code so that the traffic channel transmission to each mobile station is orthogonal to traffic channel transmissions to every other mobile station.

In addition to traffic channels, the base station 102 broadcasts other signals such as a pilot signal over a pilot channel, a synchronization signal over a synchronization channel, and a paging signal over a paging channel. The pilot channel is commonly received by all mobile stations within range and is used by the radiotelephone 104 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the base station 102 to mobile stations including the radiotelephone 104.

In alternate embodiments, the pilot signals comprise multiple pilot signals transmitted over a plurality of channels. Some of the pilot signals can be used, for example, for initial acquisition and signal strength determination. Other of the pilot signals can be used for storing group information, such as a group of base station identities.

In addition to the Walsh covering, all channels transmitted by the base station are spread using a pseudorandom noise (PN) sequence. In the illustrated embodiment, the base station 102 and all base stations in the communication system 100 are uniquely identified by using a unique starting phase, also referred to as a starting time or phase shift, for the pilot channel PN sequence. The PN sequence is of a length $2^{15}$ chips that are produced at a chip rate of 1.2288 Mega-chips per second, and the PN sequence repeats at approximately every 26.66 milliseconds (msec). The minimum permitted time separation is 64 chips, allowing a total of 512 different PN code phase assignments. The spread pilot channel modulates a radio frequency (RF) carrier and is transmitted to all mobile stations including the radiotelephone 104 in a geographic area served by the base station 102. The PN sequence can be complex in nature, comprising both in-phase (I) and quadrature (Q) components.

In an alternate embodiment, the base stations are asynchronous to one another, meaning that there is no common timing reference synchronizing all of the base stations together. The pilot signals transmitted from one base station are thus not synchronous to pilot signals transmitted by another base station. The radiotelephone 104 comprises an antenna 106, an analog front end 108, microprocessor, logic, and control circuitry 116, a receive path, and a transmit path. The receive path includes an analog to digital converter (ADC) 110 and a receiver modem 111; the transmit path includes a digital to analog converter 120 and a transmission path circuit 118. The receiver modem 111 includes a RAKE receiver 112, a searcher receiver 114, a branch timing unit 140, a searcher timing unit 142, and a system timing unit 146.

The antenna 106 receives RF signals from the base station 102 and from other base stations in the vicinity. Some of the received RF signals are direct line of sight rays transmitted by the base station. Other received RF signals are reflected or multi-path rays and are therefore delayed in time relative to the line of sight rays.

Received RF signals are converted to electrical signals by the antenna 106 and provided to the analog front end 108. The analog front end 108 performs functions such as filtering, automatic gain control, and conversion of signals to baseband signals. The analog baseband signals are provided to the ADC 110, which converts them to streams of digital data for further processing.

The RAKE receiver 112 includes a plurality of demodulation branches, including first demodulation branch 122, second demodulation branch 124, third demodulation branch 126, and fourth demodulation branch 128. In the illustrated embodiment, the RAKE receiver 112 includes four demodulation branches. However, other numbers of demodulation branches could be used, including only one demodulation branch. The demodulation branches are modified from conventional design to minimize activation time and power; further explanation follows in conjunction with FIGS. 2 through 6.

Figure 1:
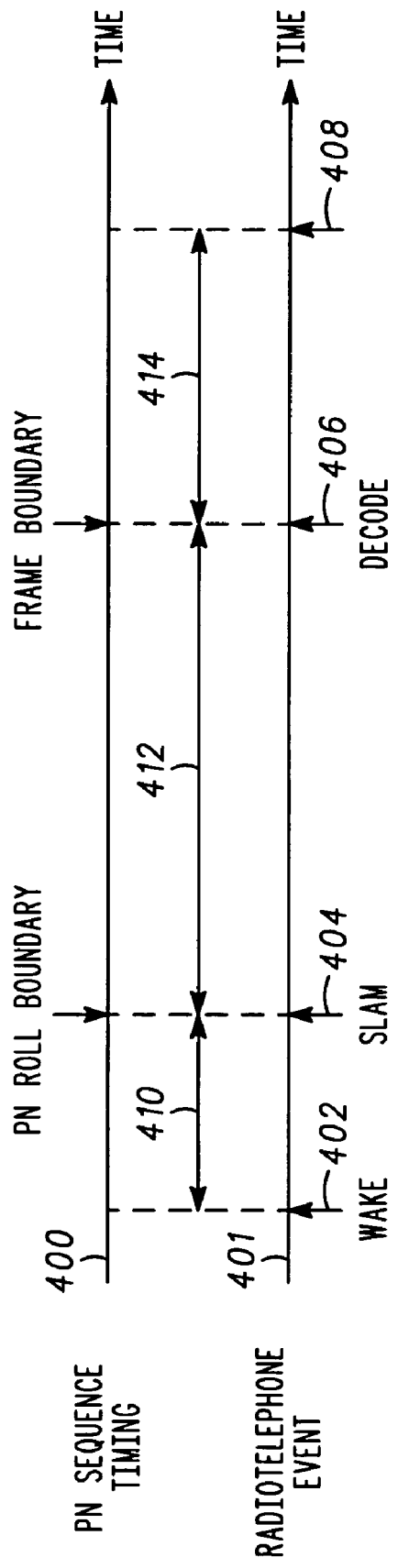
FIG. 1 is a prior art timing diagram showing how the prior art spread-spectrum radiotelephone wakes up from an idle mode to decode a slotted paging message.

The microprocessor, logic, and control circuitry 116 includes a microprocessor 117 and a clock 134. The clock 134 controls timing of the radiotelephone 104. The microprocessor, logic, and control circuitry 116 is coupled to other elements of the radiotelephone 104, but such interconnections are not shown in FIG. 1 so as to not unduly complicate the drawing figure.

Generally, the searcher receiver 114 within the receiver modem 111 detects pilot signals received by the radiotelephone 104 from the plurality of base stations, including the base station 102. The searcher receiver 114 despreads the pilot signals using a correlator with PN codes generated in the radiotelephone 104. After this despreading, the signal values for each chip period are accumulated over a preselected interval of time. This provides a coherent sum of chip values. This sum is compared against a threshold level. Sums exceeding the threshold level generally indicate a suitable pilot signal ray that can be used for pilot signal timing synchronization.

Figure 3:
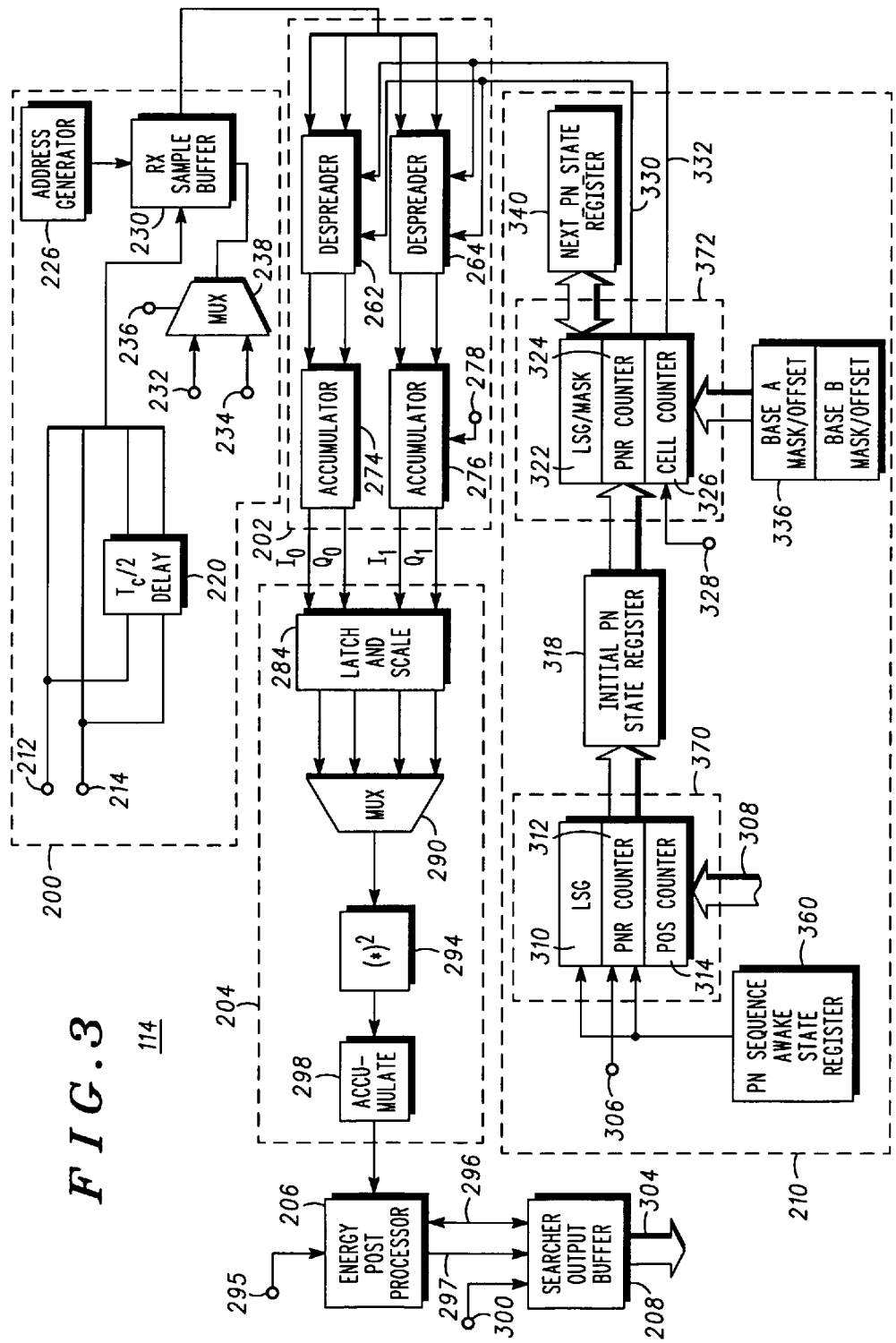
FIG. 3 is a block diagram of a searcher receiver for use in the radiotelephone of the communication system of FIG. 2.

Referring to FIG. 3, the searcher receiver 114 includes a sample buffer system 200, a two-phase correlator 202 coupled to the sample buffer system 200, an energy calculator 204 coupled to the two-phase correlator 202, an energy post-processor 206 coupled to the energy calculator 204, a searcher output buffer 208 coupled to the energy post-processor 206, and a PN generator system 210 coupled to the two-phase correlator 202. The sample buffer system 200 includes a delay circuit 220 coupled to a receiver sample buffer 230, an address generator 226 coupled to the receiver sample buffer 230, and a multiplexer 238 coupled to the receiver sample buffer 230. The two-phase correlator 202 includes a first despreader 262 coupled to a first accumulator 274 and a second despreader 264 coupled to a second accumulator 276. The energy calculator 204 comprises a latch and scale circuit 284 coupled to a multiplexer 290, a squaring circuit 294 coupled to the multiplexer 290, and an accumulate circuit 298 coupled to the squaring circuit 294.

The PN generator system 210 includes a PN sequence awake state register 360 coupled to a real-time PN generator 370, an initial PN state register 318 coupled to the real-time PN generator 370, a high-speed PN generator 372 coupled to the initial PN state register 318, a mask register 336 coupled to the high-speed PN generator 372, and a next PN state register 340 coupled to the high-speed PN generator 372.

The real-time PN generator 370 includes a real-time linear sequence generator (LSG) 310 coupled to a real-time PN roll (PNR) counter 312 and a real-time position counter 314. The high-speed PN generator 372 includes a high-speed LSG 322 coupled to the high-speed PN roll (PNR) counter 324 and a high-speed cell counter 326. The circuitry within the real-time PN generator 370 and the high-speed PN generator 372 generally comprise flip-flops.

A CDMA radiotelephone operable in a slotted paging mode thus includes a searcher receiver periodically activated to find a pilot signal of suitable signal strength, the searcher receiver synchronizing to a pseudorandom noise (PN) sequence timing of the pilot signal after each periodic activation of the searcher receiver. The radiotelephone also includes at least one demodulation branch coupled to the searcher receiver, and control circuitry to periodically activate the at least one demodulation branch substantially after each periodic activation of the searcher receiver and to direct the at least one demodulation branch to synchronize relative to the PN sequence timing of the pilot signal after each periodic synchronization of the searcher receiver. The control circuitry comprises a microprocessor. The radiotelephone further includes a system timing unit coupled to the at least one demodulation branch, and the microprocessor periodically activates the system timing unit substantially after each periodic activation of the searcher receiver and directs the system timing unit to synchronize relative to the PN sequence timing of the pilot signal after each periodic synchronization of the at least one demodulation branch.

Figure 4:
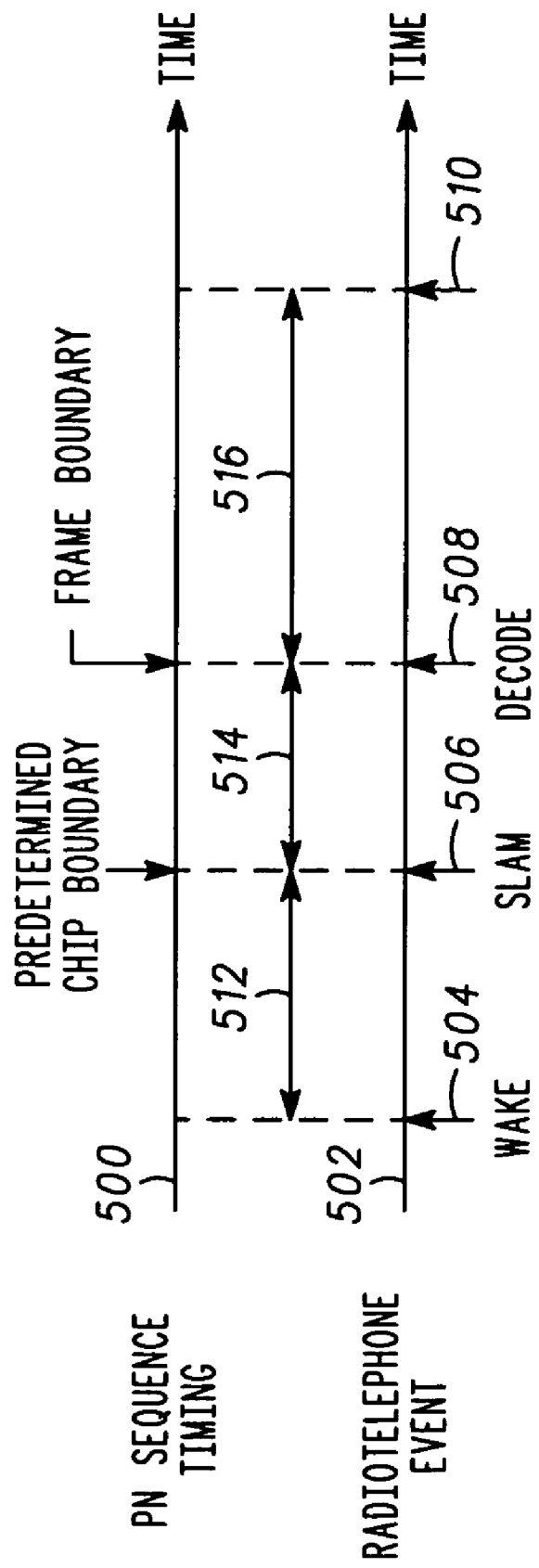
FIG. 4 is a timing diagram showing activation of the radiotelephone of FIG. 2.

A description of how the receiver modem 111 (FIG. 2) and the searcher receiver 114 (FIGS. 2 and 3) activate from a sleep state during slotted paging mode operation is set forth below in conjunction with the timing diagram of FIG. 4 and the flow diagram of FIG. 6. In FIG. 4, the PN sequence timing is shown on time axis 500, and the corresponding radiotelephone 104 event is shown on time axis 502. The time axis 500 shows that a predetermined PN chip boundary occurs at time 506, and a frame boundary occurs at time 508.

In addition to the PN roll boundary of the PN sequence as defined by the cellular system standard, there is another designation termed a predetermined PN chip boundary. In the illustrated embodiment, the predetermined chip boundary is chosen to occur on the $512^{th}$ chip of the PN sequence and is thus referred to as the 512-chip boundary; the 512-chip boundary is aligned with the PN roll boundary. In the IS-95 system, the transmitted chip rate is 1.2288 MHz, so the 512-chip boundary occurs once every 0.4166 msec. Other predetermined chip boundaries can be used as well. In the IS-95 system, the frame boundary occurs every 80 msec (e.g. this is when the radiotelephone must wake up to receive a paging message), and the frame boundary is aligned with the PN roll boundary.

A method of operating the radiotelephone 104 in a slotted paging mode starts at block 600. The radiotelephone enters a sleep state at block 602.

At block 604 the microprocessor 117 (FIG. 2) notes the current PN sequence state and stores the current PN sequence state in a register as a PN sequence sleep state. While the radiotelephone is sleeping (e.g. prior to time 504 of FIG. 4), clock signals to portions of the receiver modem 111 (FIG. 2) are gated off to inactivate those portions, thereby reducing power consumption. For example, during the sleep state, clock signals to the RAKE receiver 112, the searcher receiver 114, the branch timing unit 140, the searcher timing unit 142, and the system timing unit 146 are gated off.

Figure 6:
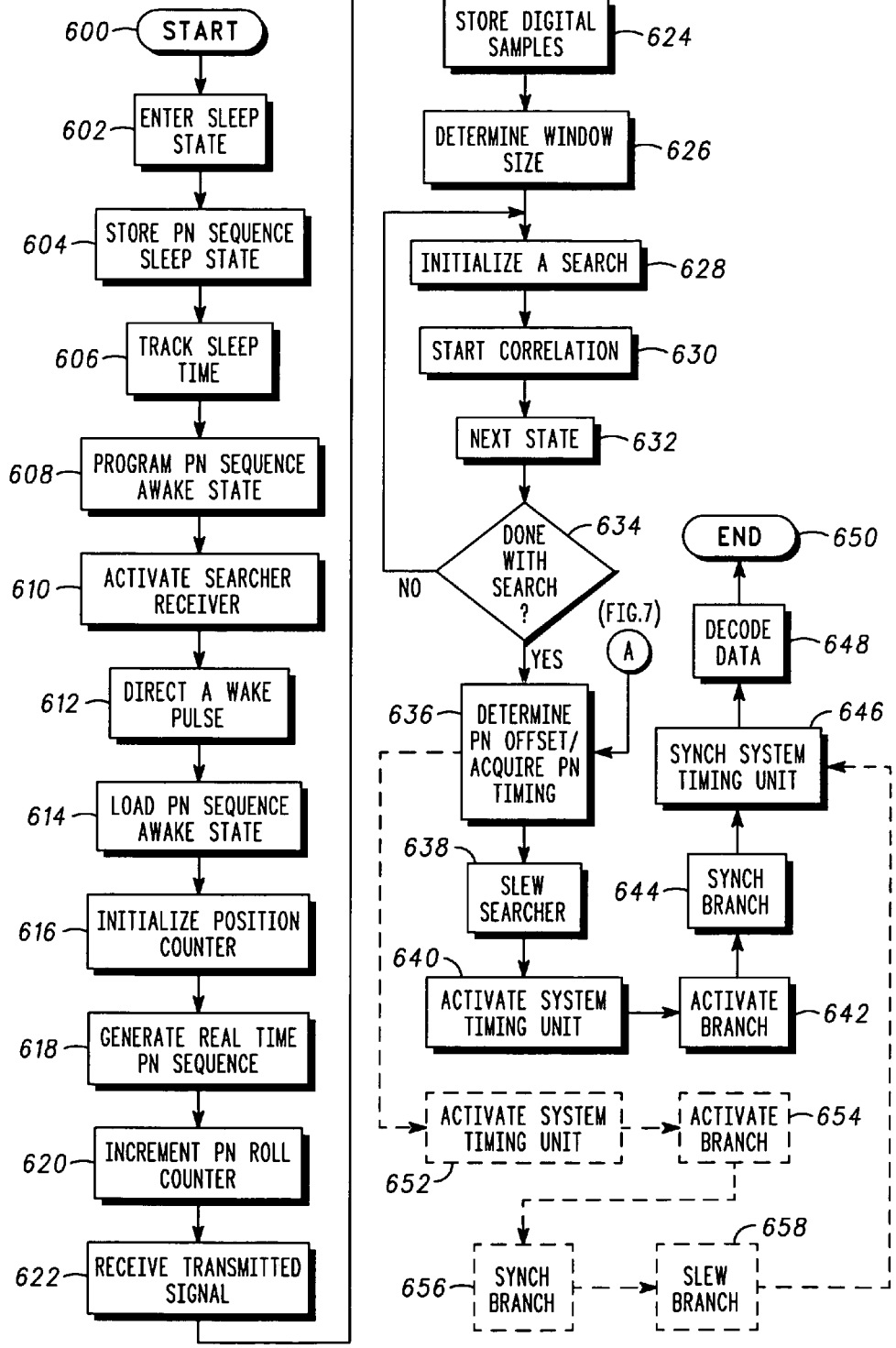
FIG. 6 is a flow diagram illustrating a method of activating the radiotelephone FIG. 2 operating in a slotted paging mode.

The radiotelephone 104 remains in the sleep state for a predetermined period of time, and the microprocessor 117 keeps track of that time at block 606 (FIG. 6). The microprocessor 117 can use the clock 134 to track the idle time; alternatively, another clock (not shown) that does not go to sleep can be used. For example, a clock external to the microprocessor 117 can be utilized. Prior to time 504 (FIG. 4) the microprocessor 117 uses both the PN sleep state and the time that the radiotelephone 104 remained asleep to program a PN sequence awake state into the PN sequence awake state register 360 (FIG. 3) at block 608 (FIG. 6).

At time 504 (FIG. 4), a WAKE event occurs, thus initiating several receiver modem 111(FIG. 2) actions. At least a portion of the receiver modem 111 circuitry, such as the searcher receiver 114 and the searcher timing unit 142, is activated at block 610 (FIG. 6) by applying a clock signal to the receiver modem 111 (FIG. 2). In an alternate embodiment, the searcher timing unit 142 is encompassed within the searcher receiver 114 and is thus considered part of the searcher receiver 114. Circuitry within the receiver modem 111 other than the searcher receiver 114 and the searcher timing unit 142, however, remain gated off. For example, the RAKE receiver 112, the branch timing unit 140, and the system timing unit 146 initially remain inactive.

To activate a portion of the receiver modem 111, a chip clock signal is applied to the real-time PN generator 370 (FIG. 3) through input 306 (FIG. 3) to activate the real-time PN generator 370. The chip clock signal operates at the PN chip speed and can originate from any suitable source, such as the clock 134 of the microprocessor, logic, and control circuitry 116. In addition, the searcher timing unit 142 is activated by applying an 8× clock signal. The searcher timing unit 142 contains control circuitry, registers, and a counter to configure and coordinate the timing of the real-time PN generator 370. The counter within the searcher timing unit 142 counts at a speed that is eight times as fast as the real-time chip clock signal and provides for high resolution tracking of the PN sequence. In sum, at time 504 only approximately 20% of the receiver modem 111 circuitry is activated. This is designated as an intermediate, low-power mode.

After activating at least a portion of the searcher receiver 114, the searcher receiver must acquire a transmitted signal, and in the illustrated embodiment, the transmitted signal comprises at least one pilot signal. In alternate embodiments, the transmitted signal can comprise multiple pilot signals on more than one channel, and the pilot signals on these channels can be code-division multiplexed or time-division multiplexed.

As part of the WAKE event, at block 612 (FIG. 6) the microprocessor 117 enables a WAKE pulse, and at block 614 the PN sequence awake state is read from the PN sequence awake state register 360 (FIG. 3) and loaded into the real-time PN generator 370 to establish a timing reference. This awake state information includes the 15-bit state of the in-phase and quadrature-phase PN sequence that is loaded into the real-time LSG 310 (FIG. 3). The awake state also includes the 15-bit state of the real-time PN roll counter 312 (FIG. 3). The PN roll-counter 312 counts the number of chips and the number of symbols since the last PN roll boundary to indicate the present position within the PN sequence. This roll counter information is important for achieving the high resolution SLAM that will occur at time 506 (FIG. 4).

At block 616 (FIG. 6), the WAKE pulse also causes the real-time position counter 314 (FIG. 3) to be initialized to an initial value (e.g. state). The real-time position counter 314 is used at a later stage of activation and changes state whenever the real-time PN generator 370 is slewed. For example, if the real-time PN generator 370 is slewed by four chips, the real-time position counter 314 will track that. The slew control is applied on line 308, and the state or value of the real-time position counter 314 is held constant when the real-time PN generator 370 is not being slewed.

At block 618 (FIG. 6) the real-time PN generator 370 starts to generate a PN sequence at a first rate that is substantially equivalent to the rate of the chip clock signal present at input 306. This first rate is substantially equivalent to the chip rate of the received signal. The chip clock signal represents a first rate in terms of receiver modem 111 speed of operation. Thus, the real-time LSG 310 increments the PN sequence real-time state at the chip rate to generate I and Q samples of the PN sequence at every clock cycle, and at block 620 (FIG. 6) the real-time PN roll counter 312 increments at the first rate for every clock cycle. This PN sequence generation represents an initial estimation of the position of the received PN sequence.

The searcher receiver 114 (FIGS. 2 and 3) then detects a pilot signal to acquire system timing. At block 622 (FIG. 6), as the PN generator 370 is generating the PN sequence, the ADC 110 (FIG. 2) receives a transmitted analog signal from the analog front end 108 and converts the analog signal to digital samples that are applied to an in-phase (I) input 212 and a quadrature-phase (Q) input 214 (FIG. 3). A delayed version of the digital samples, comprising the digital samples delayed by one-half of a chip duration, is produced by delay circuit 220.

At block 624 (FIG. 6) the digital samples and the delayed versions of the digital samples are stored in the receiver sample buffer 230. The delayed version is produced so that two energies at a half-chip time separation can be calculated simultaneously during the high-speed pilot signal search subsequent to the receiver sample buffer 230 being filled with samples. If duplicate hardware is not included in the searcher receiver 114 (e.g. only one correlator instead of the two correlators shown here in the two-phase correlator 202), then it may not be necessary to produce a delayed version of the incoming samples. Alternatively, if more correlators are included in the searcher receiver 114, more delayed versions may need to be generated. Since the delayed versions are produced substantially simultaneously as the digital samples are received, the detection of the pilot signal digital samples occurs at substantially twice the chip rate.

An address generator 226 instructs the receiver sample buffer 230 as to where to write each of the digital samples and the delayed versions of the digital samples (and later where to read the stored data). In the illustrated embodiment, the received I and Q digital samples are four bits each, yielding eight bits for a single I–Q sample pair; the delayed version is another eight bits. The combined I–Q pair and the delayed version comprises sixteen bits, so the width of the receiver sample buffer 230 is sixteen bits. There are memory locations for 1024 sixteen bit samples. Other memory configurations and bit structures can be utilized.

Two different clock signals are applied to the multiplexer 238. The chip clock signal operating at real time is applied to first input 232, and a high-speed clock signal is applied to second input 234. The high-speed clock signal operates at a faster speed than the chip clock signal. Selection of the clock signals is made by applying a control signal to control input 236. While the receiver sample buffer 230 is loading digital samples, the chip clock signal is selected on the multiplexer 238. Thus the digital samples are loaded into the buffer at the real time clock speed, but since the delayed versions are produced substantially simultaneously as the digital samples are received, the detection of and storing of the pilot signal digital samples occur at substantially twice the chip rate.

The samples stored in the receiver sample buffer 230 represent the pilot signals received by the searcher receiver 114. The signal may contain directly-received pilot signals and/or multi-path rays. The receiver sample buffer 230 thus provides a buffer for storing a plurality of samples of a received signal.

When the very first I and Q samples are written into the receiver sample buffer 230, the PN state of the real-time PN generator 370 at this instance in time is noted and loaded into the initial PN state register 318. This will indicate how the stored samples are referenced to the PN sequence generated by the real-time PN generator 370.

After detecting a pilot signal, the real-time PN generator 370, and thus the searcher receiver 114, is synchronized to a PN sequence timing related to at least a portion of a detected pilot signal. Thus, during time duration 512 (FIG. 4) but after the receiver sample buffer 230 (FIG. 3) is filled, a high-speed search is performed to search the stored samples for a suitable pilot signal (e.g. for a pilot signal which produces a correlation energy above a predetermined threshold value). For the high-speed search, substantially all of the circuitry of the searcher receiver 114 (FIGS. 2 and 3) except for the real-time PN generator 370 operates at the higher speed of the high-speed clock signal (for figure clarity, the high speed clock signal is shown as being applied only to the second multiplexer input 234, a high speed clock input 278 of the second accumulator input 278, and the high-speed PN generator 372 at input 328). Thus, the multiplexer 238 is switched from the chip clock signal present at input 232 to the high-speed clock signal present at second input 234 (FIG. 3).

At block 626 (FIG. 6) the microprocessor 117 (FIG. 2) determines a window size over which to search the stored samples. For example, a window size of four will dictate a search of four separate one-half chip offsets of PN space. Since the two-phase correlator 202 (FIG. 2) comprises two correlators, two different offsets can be searched simultaneously. It is recognized that other suitable window sizes can be selected, and other hardware configurations are envisioned such that less or more searches can be performed simultaneously.

At block 628 (FIG. 6) one of the searches within the prescribed window size is initialized by the microprocessor 117. The searcher receiver 114 searches for a suitable PN sequence offset at the second rate of the high speed clock. A suitable PN sequence offset is one that generates a high correlation energy for the detected digital samples. Here, the second rate is faster than the first rate.

For the first pair of searches, the high-speed cell counter 326 of the high-speed PN generator 372 (FIG. 3) is initialized to zero. The PN state stored in the initial PN state register 318 is loaded into the high-speed PN generator 372 so that the high-speed LSG 322 and the high-speed PNR counter 324 are set to the proper values. This will ensure that the samples that are searched and correlated will be referenced to the real-time PN sequence present when the samples were originally detected and written to the receiver sample buffer 230. The high-speed PN generator 372 will then re-generate the original real-time PN sequence at the higher clock speed, and apply those PN signals to the first despreader 262 and the second despreader 264 (FIG. 3). The in-phase PN sequence is applied through line 330, and the quadrature-phase PN sequence is applied through line 332 (FIG. 3).

When the high-speed PN generator 372 has incremented one chip in the PN sequence, that state is stored into the next-PN-state register 340. This will be used as the starting point for the next high speed search within the predetermined window size. The next starting point is advanced a whole chip from the initial PN state because a half chip increment is already correlated from the delayed version of the digital sample.

The two-phase correlator 202 (FIG. 3) correlates the samples in the receiver sample buffer 230 with the PN sequence generated from the high-speed PN generator 372 to produce a correlation result. At block 630 (FIG. 6) a correlation is started. For the correlation process, the samples are first despread with first despreader 262 and second despreader 264. The despreaders are multipliers or other despreading circuitry as is known to those skilled in the art. Next, the despread data is applied to the first accumulator 274 and the second accumulator 276. The accumulators comprise accumulation and summing circuitry and logic circuitry known to those skilled in the art.

The sums generated in first accumulator 274 and second accumulator 276 are applied to the energy calculator 204. The accumulated signals are first applied to the latch and scale circuit 284. The latch and scale circuit 284 comprises flip-flop circuitry and can alternatively be incorporated into the first accumulator 274 and the second accumulator 276. Combinational logic within the latch and scale circuit 284 is used to scale the accumulated values as necessary for energy post processing.

The latch and scale circuit 284 is used to latch either an intermediate correlation result or a final correlation result (e.g. correlation over a prescribed correlation length) for performing an energy calculation. For example, if the prescribed correlation length for a particular PN offset is 256 chips, an intermediate length can be selected to be 64 chips. When the first 64 chips are accumulated at the two-phase correlator 202, the accumulated value is latched and its energy value calculated and compared to an intermediate threshold value present at threshold input 295 of energy post-processor 206. An intermediate energy calculation is first performed to determine if the offset presently used for the high-speed search is producing a suitably high energy result. If it is not, the high speed search for that particular offset is abandoned, and the high-speed search continues for the next PN offset. Other prescribed correlation lengths and intermediate correlation lengths can be used.

If the intermediate calculated energy value is above the intermediate energy threshold value, the two-phase correlator 202 is unlatched and the rest of the samples for that PN offset are despread and accumulated via the two-phase correlator 202 for the prescribed accumulation length. The latched and scaled accumulated values are applied to multiplexer 290 and then sequentially applied to squaring circuit 294. Thus, the accumulated $I_0$ is first applied to the squaring circuit 294 and squared, and the squared value is applied to the accumulate circuit 298. Then the accumulated $Q_0$ is squared and applied to the accumulate circuit 298 to produce the total energy value of the correlation (e.g. $I_0^2+Q_0^2$).

The energy value is compared against a second threshold value present at threshold input 295 of the energy post-processor 206. If the energy value is above the second threshold value, an energy indicator bit associated with that energy value is asserted high. If the energy value is below the second threshold value, the energy indicator bit associated with that energy value is asserted low.

At the beginning of a high-speed search, all the storage locations within the searcher output buffer 208 are initiated to zero. The first correlation energy value along with its associated energy indicator bit is then applied through line 296 to the searcher output buffer 208 and stored in one of the storage locations.

Throughout the high-speed search, the energy post-processor 206 keeps track of which location within the searcher output buffer 208 is storing the lowest energy signal. If a currently calculated energy value is greater than the signal with the minimum energy already stored in the searcher output buffer 208, the energy post-processor 206 will cause the newly calculated energy value to overwrite that register within the searcher output buffer 208 by sending a location over line 297.

As previously stated, when a high speed search is initiated, the searcher output buffer 208 is initialized to have all energy values in its storage locations set to zero. The first few energies that are calculated will automatically be written into the searcher output buffer 208 since the calculated energy values will be greater than the zeros initialized in the storage locations. Even if the final accumulated value over the prescribed correlation length is less than the second threshold value, that energy value will be stored in the searcher output buffer 208 with an associated energy indicator bit asserted low. Once the searcher output buffer 208 is full, if more searches are being performed (because the window size is larger than the buffer size) calculated energy values are compared against stored energy values. The newly calculated energy value will then overwrite a stored energy value if the calculated energy value is greater. The stored energy values are passed back to the energy post-processor 206 for comparison via line 296.

The read/write position of each stored energy value is selected by a searcher position signal applied at selection input 300. This searching process is repeated until the high-speed search has been performed for the prescribed window size.

For a window size of four, a total of four high-speed searches are performed, two at a time. The first pair of high-speed correlations that are simultaneously performed will produce energy values of $I_0^2+Q_0^2$ and $I_1^2+Q_1^2$. Two more searches still need to be performed after the first two high-speed searches involving $I_0/Q_0$ and $I_1Q_1$ are performed.

For the next high speed searches, the address generator 226 (FIG. 3) moves the pointer in the receiver sample buffer 230 back to the first written data samples at block 632 (FIG. 6). Also, the starting state for the high-speed LSG 322 originates from the next-PN-state register 340; this state is advanced 1 chip (since the first two correlations were over a zero PN offset and a half chip PN offset) from the state stored in the initial PN state.

The high-speed cell counter 326 will increment every time the high-speed PN generator 372 is offset from the initial PN state originally stored in the initial PN state register 318. For example, for the first two correlations of the window size of four, the high-speed cell counter 326 has a value of zero. When the high-speed PN generator 372 is advanced one chip for the next two correlations, the high-speed cell counter 326 is incremented to a value of one. The high speed search process is then initiated with the advanced-by-one-chip PN sequence.

When the number of high-speed searches performed is equal to the selected window size, the high speed search process is complete at decision block 634. At block 636 the microprocessor 117 reads the energies stored in the searcher output buffer 208 over line 304 and determines the highest energy value associated with a pilot signal ray as well as the PN sequence position of the pilot signal. This is equivalent to acquiring a PN sequence timing of the pilot signal.

At block 638 (FIG. 6), the real-time PN generator 370 (FIG. 3) is slewed to match the phase of the selected pilot signal. Specifically, the real-time LSG 310 and the real-time PNR counter 312 are slewed to match the phase of the selected ray, and the real-time position counter 314 is incremented to track the slewing. The real-time PN generator 370 and the searcher receiver 114 are now synchronized to the PN sequence timing of the selected pilot signal.

Prior to time 506 (FIG. 4), the radiotelephone 104 is brought out of low-power mode at blocks 640 and 642 (FIG. 6). Alternatively stated, the radiotelephone 104 is directed to switch from the low-power mode to a demodulation mode. For the demodulation mode, more circuitry within the receiver modem 111 (FIG. 2) is enabled by applying a clock signal. For example, the system timing unit 146 is enabled by applying a clock signal to it at block 652 (FIG. 6). A gated version of the clock signal is applied to at least one of the demodulation branches of the RAKE receiver 112 and the branch timing unit 140 at block 636 (FIG. 6) to enable them at block 654 (FIG. 6). The clock signal applied to each of the demodulation branches of the RAKE receiver 112 is a gated version of the clock signal to the branch timing unit 140 so that each of the demodulator branches of the RAKE receiver 112 may be individually gated on or off. Not all of the demodulation branches need to be activated at this time.

Figure 5:
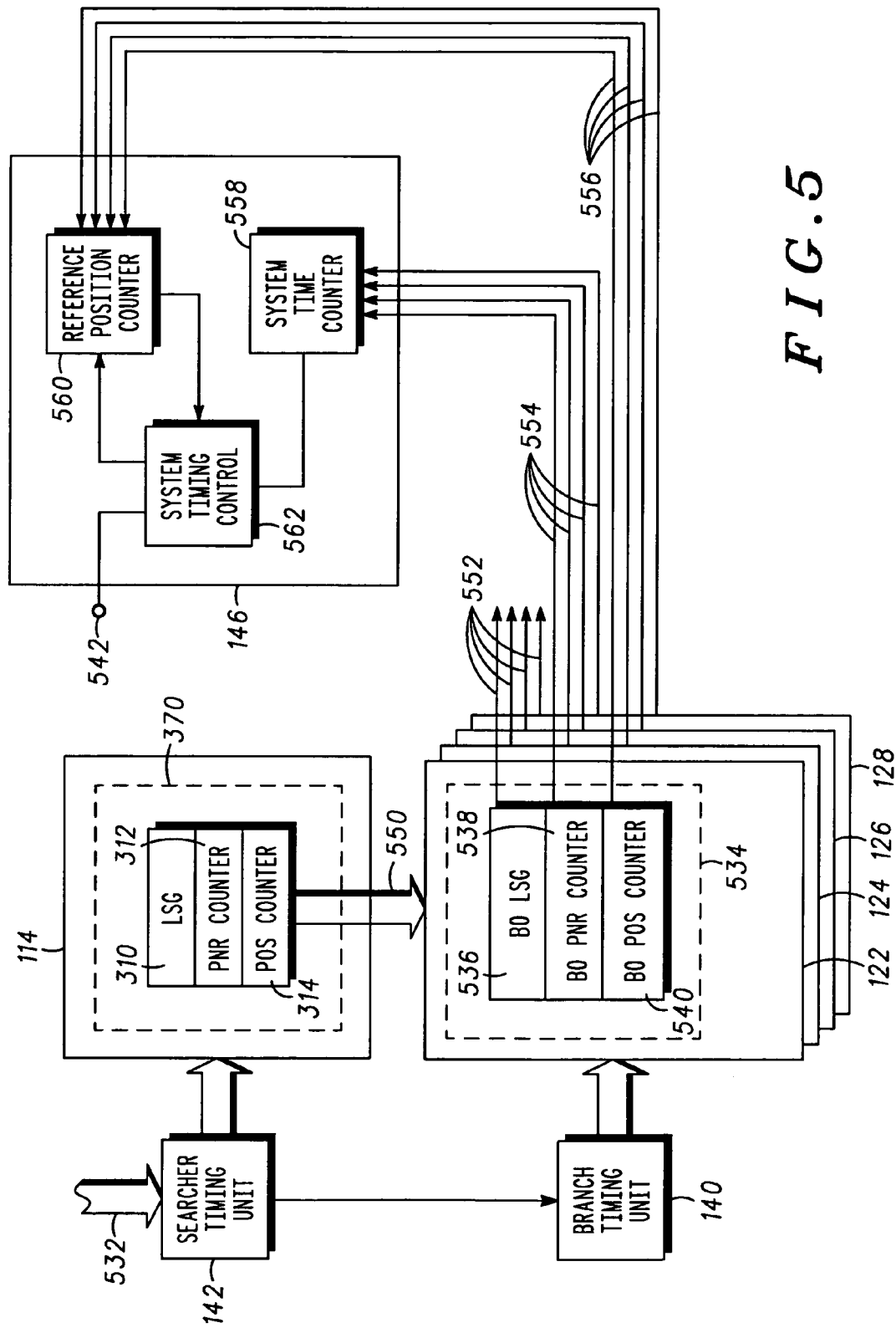
FIG. 5 is a block diagram illustrating the interaction of the various timing elements within the receiver modem of the radiotelephone of FIG. 2.

Still just prior to time 506 (FIG. 4), a demodulation branch synchronization is initiated at block 644. Thus, after activating the at least one demodulation branch, the at least one demodulation branch is synchronized to the real-time PN generator 370 of the searcher receiver 114. This branch synchronization is explained with reference to FIGS. 2, 3, 4, and 5. FIG. 5 shows how the real-time PN generator 370 of the searcher receiver 114 interacts with the searcher timing unit 142, the branch timing unit 140, the system timing unit 146, and the branch PN generators for each of the demodulation branches (e.g. first demodulation branch 122, second demodulation branch 124, third demodulation branch 126, and fourth demodulation branch 128).

For clarity in FIG. 5, only specific timing block circuitry is shown for the searcher receiver 114, the plurality of demodulation branches (122, 124, 126, and 128), and the system timing unit. It will be understood by those skilled in the art that this is just a representative interaction block diagram, and more circuitry is associated with each of the blocks. Also for clarity, the branch PN generator 534 for the first demodulation branch 122 is shown; each demodulation branch has a similar branch PN generator.

Two steps are performed for the demodulation branch synchronization. First, the branch timing unit 140 is synchronized to the searcher receiver 114. This is accomplished by the microprocessor 117 (FIG. 2) directing through line 532 the branch timing unit 140 (FIGS. 2 and 5) to synchronize its phase to the high resolution phase of the searcher timing unit 142 (FIGS. 2 and 5). Like the searcher timing unit 142, the branch timing unit 140 contains control circuitry, registers, and a high resolution phase counter. The branch timing unit 140 configures and coordinates the timing for the branch PN generators. Second, at least one demodulation branch is synchronized to the position of the real-time PN generator 370 of the searcher receiver 114. This is accomplished by loading through line 550 the PN state information, including a state of the PN roll count and the state of a PN position count, from the searcher receiver 114 real-time PN generator 370 to the PN generator of at least one demodulation branch (here branch PN generator 534 of first demodulation branch 122).

The position of the real-time LSG 310 is loaded into the first branch LSG 536, the state of the real-time PNR counter 312 (referred to as the state of the PN roll count) is loaded into the first branch PNR counter 538, and the real-time position counter 314 (referred to as the state of the PN position count) is loaded into the first branch position counter 540. This branch synchronization process can initially be performed on only one demodulation branch, or more than one demodulation branch can be activated and synchronized to the searcher receiver 114. At this point, the selected demodulation branches have been synchronized.

In considering the actual duration of time duration 512 (FIG. 4), the slewing process of the real-time PN generator 370 and the branch synchronization process are performed at a very high speed and represent a negligible portion of the total time duration 512. Moreover, since the pilot signal high-speed search was performed at the high clock speed, the high-speed search process is performed much faster than prior art spread spectrum systems. Time duration 512 (FIG. 4) to complete the WAKE event, the high-speed pilot search, and the branch synchronization is on the order of five msec. The prior art time to complete the WAKE event, the pilot search, and the searcher receiver/branch synchronization, shown as time duration 410 (FIG. 1), is on the order of 30 msec. Thus, power savings are achieved not only by turning on less circuitry during the WAKE event, pilot search process, slewing, and branch synchronization compared to the prior art, but also by operating much faster than the prior art.

Now that the searcher receiver 114 and at least one demodulation branch are synchronized to the PN sequence timing of the selected pilot signal, the rest of the receiver modem 111 must be synchronized. More specifically, the system timing unit 146 (FIGS. 2 and 5) must be synchronized at block 646. The system timing unit 146 controls the functions and interactions of the RAKE receiver 112 (FIG. 2) and other circuitry. The system timing unit instructs the receiver modem 111 on how to combine demodulated data from the multiple branches of the RAKE receiver 112, generates frame and symbol timing, and generally tracks system timing information needed to coordinate the circuitry within the receiver modem 111.

Synchronizing the system timing unit 146 (FIG. 5) is termed a SLAM event. Referring to FIG. 4, the SLAM occurs at time 506. Since the searcher receiver 114 and at least one demodulation branch have already been synchronized to a pilot signal, the SLAM can be programmed to occur at a predetermined PN chip boundary by passing the necessary information to the system timing unit 146. This predetermined PN chip boundary can occur much sooner in time than the PN roll boundary. Here the predetermined PN chip boundary occurs every five hundred and twelve chips, whereas the PN roll boundary occurs every $2^{15}$ chips. Thus, the predetermined PN chip boundary denotes less than a full length of the PN sequence.

Synchronizing the system timing unit 146 at a predetermined PN chip boundary that is less than the PN roll boundary is termed a high resolution SLAM because the synchronization occurs much closer to the time 508 when decoding begins as compared to the prior art radiotelephone. For example, for a 512-chip boundary, the SLAM occurs approximately 0.42 msec prior to time 508 when page decoding begins; this is compared to the prior art radiotelephone commencing a SLAM at the next available PN roll boundary, which occurs approximately 26.6 msec before the page decoding begins.

During the SLAM event, the PN state information is transferred from the at least one demodulation branch to the system timing unit 146. Specifically, the states of the branch PNR counters (e.g. branch PNR counter 538) are directed over the plurality of lines 554 to the system time counter 558. The states of the branch position counters (e.g. branch position counter 540) are transferred over the plurality of lines 556 to the reference position counter 560. The system time counter 558 tracks the cellular network system time, and the reference position counter 560 references the position of a ray that the system timing unit 146 is tracking. The system timing control 562 controls and coordinates activity within the system timing unit 146 and receives instructions at input 542 that are directed from the microprocessor 117 (FIG. 2).

The PN signal for each demodulation branch is generated by a respective branch LSG and appears on the plurality of lines 552. At block 648 (FIG. 6) the PN signals are then used by the respective branches to decode paging messages and generally demodulate data starting at time 508. The method ends at block 650 (FIG. 6) when the paging message is decoded.

An alternate embodiment is also shown in FIG. 6 with a different sequence of steps occurring after block 636. During time duration 512 (FIG. 4), the system timing unit 146 is activated at block 652, and the branch timing unit 140 and at least one demodulation branch are activated at block 654. The branch timing unit 140 and the at least one demodulation branch are synchronized to the searcher timing unit 142 and the searcher receiver 114, respectively, at block 656.

The at least one demodulation branch is slewed to a PN timing of the at least one pilot signal at block 658. The branch LSG 536 and the branch PNR counter 538 are slewed to match the phase of the selected ray, and the branch position counter 540 is incremented to track the stewing. At block 646 (FIG. 6) the system timing unit 146 is then synchronized to the at least one demodulation branch. Other embodiments for activating and synchronizing the system timing unit and the demodulation branches after acquiring the PN sequence timing of a pilot signal will be evident to those skilled in the art.

In another alternate embodiment, the searcher receiver 114 does not include the receiver sample buffer 230 and the high-speed PN generator 372. The searcher receiver is still enabled first, and the clock signals to the system timing unit and a demodulation branch after activation of searcher receiver to save power.

The steps of activating the system timing unit and activating at least one demodulation branch can be described more generally as activating them after a predetermined event has occurred, the predetermined event occurring after activating at least a portion of the searcher receiver. The predetermined event can also comprise the initiation or completion of any of the steps performed for acquiring the PN sequence timing of at least one pilot signal.

As can be seen from the foregoing, the present invention provides a method and apparatus for activating a spread-spectrum multiple access radiotelephone receiver. The demodulation branches and the system timing unit are activated only after a predetermined event occurs, thereby providing for substantial power savings. Providing the system timing unit with certain state information allows the system timing unit to synchronize at a predetermined chip boundary that is less than a PN roll boundary, thereby enabling the receiver modem to decode information more quickly; this provides an additional power savings. This power savings provide for a longer talk time or enables the use of a smaller batery. In addition, the slewing operation can be performed on either the searcher receiver or the demodulation branch, thereby providing flexibility in design.

The previous description of the preferred embodiments are provided to enable any person skilled in the art to use the method of or make the apparatus for activating a spread-spectrum radiotelephone receiver. Various modifications to these embodiments will be readily apparent to those skilled in the art, and the generic principles defined herein may be applied to other embodiments without the use of the inventive faculty. For example, the predetermined chip boundary for performing a SLAM can be defined to occur at other than a 512 chip boundary. The method described for activation in slotted paging mode can be adapted and applied to a radiotelephone activating into an acquisition mode. Thus, when the radiotelephone is first turned on, the searcher receiver circuitry can be activated first so that a suitable pilot signal may be detected and acquired. This may involve searching a larger PN sequence space, and perhaps even substantially all of the PN sequence space. Similar to above, the demodulation branch and the system timing unit are activated only after a predetermined event occurs, the predetermined event occurring a predetermined amount of time after activation of the searcher receiver.

Intermediate Accept Mode

Acquisition mode is when the radiotelephone 104 has not yet established a communication link with a base station and thus has not acquired the proper PN sequence timing. One example of this is when the radiotelephone 104 is first turned on by a user so that the radiotelephone 104 must acquire the PN sequence timing. In current radiotelephones, users complain of long acquisition times (e.g. long wait time before user can use the radiotelephone after turning the radiotelephone on). This long acquisition time is due, at least in part, because the searcher receiver will search the entire PN space (e.g. window size of $2^{15}$). Thus, the searcher receiver would perform a correlation corresponding to $2^{15}$ different PN sequence chip offsets. The searcher receiver has no a priori knowledge of the proper PN sequence timing.

In radiotelephone 104, an intermediate accept mode is defined. In this mode, the searcher receiver 114 (FIGS. 2 and 3) stores digital samples in the receiver sample buffer 230 (FIG. 3). When the very first I and Q samples are written into the receiver sample buffer 230, the PN state of the real-time PN generator 370 (FIG. 3) at this instant in time is noted and loaded into the initial PN state register 318 (FIG. 3). This indicates once again how the stored samples are referenced to the PN sequence generated by the real-time PN generator 370. Since there is no slotted paging mode sleep history in the acquisition mode, the starting point in the PN sequence timing is arbitrary. The designer may choose any valid PN sequence start state as defined by a particular cellular telephone standard.

As described previously, the digital samples are stored and then high speed correlations are performed to find the PN sequence timing of a suitable ray. However, in the intermediate accept mode, the searcher receiver 114 does not necessarily have to search the entire PN space (e.g. window size of 2$^{15}$). If during the correlation process a particular PN offset produces a correlation energy that exceeds an acquisition threshold energy, the high speed correlations are interrupted and the PN sequence timing corresponding to that PN offset is assigned to one of the demodulation branches (FIG. 2). Thus, in the intermediate accept mode, a PN space is searched until the acquisition threshold energy is exceeded or until the full search window (2$^{15}$ offsets) is completed.

Figure 7:
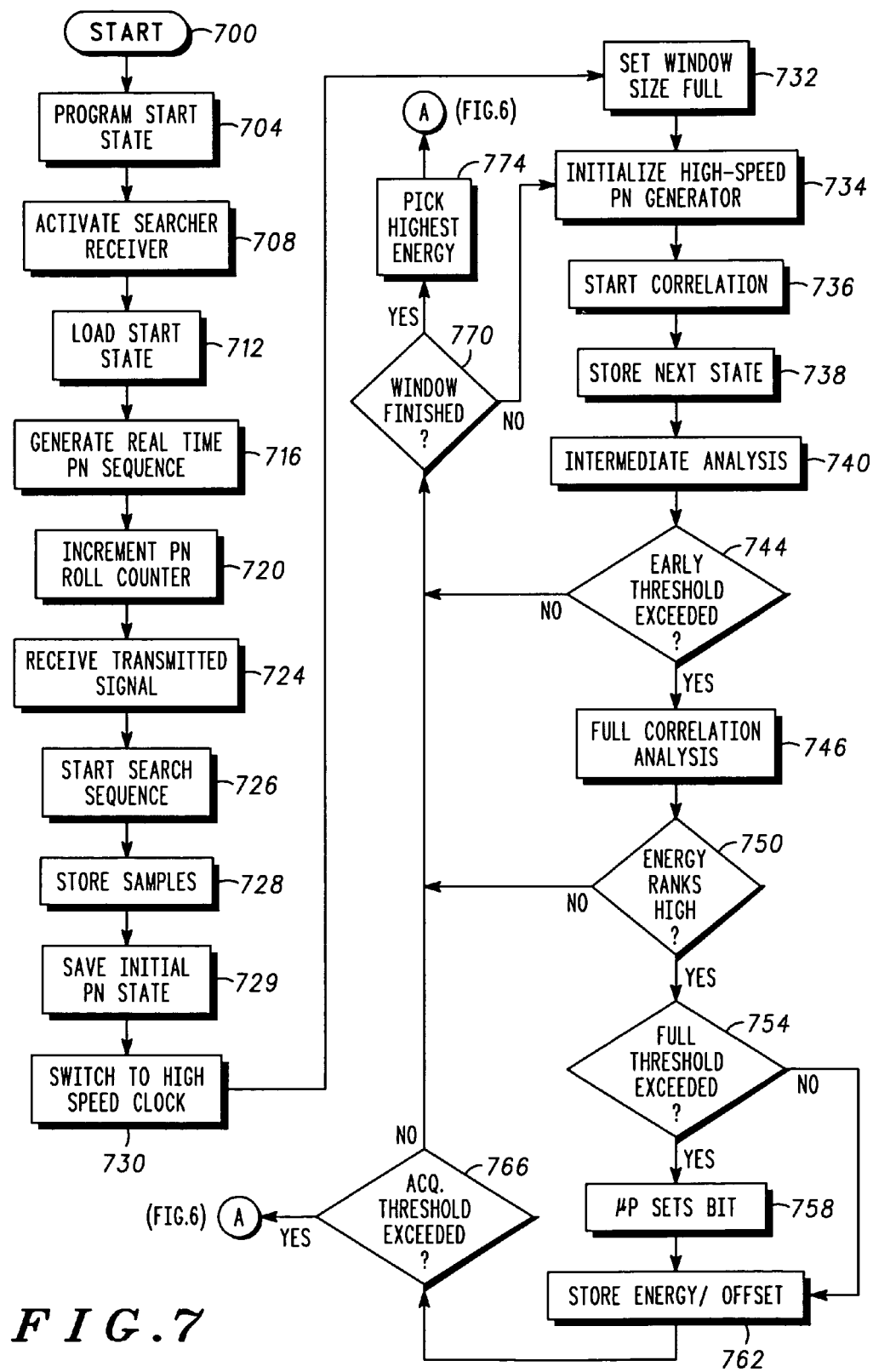
FIG. 7 is a flow diagram illustrating a method operating in an intermediate accept mode.

FIG. 7 is a flow diagram illustrating a method of operating in the intermediate accept mode. The method starts at block 700. At block 704 the microprocessor 117 (FIG. 2) stores a PN sequence start state in a register (e.g. PN sequence awake state register 360), and all the storage locations within the searcher output buffer 208 (FIG. 3) are initiated to zero.

At block 708 at least a portion of the receiver modem 111 circuitry, such as the searcher receiver 114 and the searcher timing unit 142, is activated by applying a clock signal to the receiver modem 111 (FIG. 2). Circuitry within the receiver modem 111 other than the searcher receiver 114 and the searcher timing unit 142 may remain gated off to save power. As described previously, activation of the searcher receiver is accomplished by application of a clock signal, substantially equivalent to the chip clock signal, to the real-time PN generator 370 (FIG. 3) through input 306 (FIG. 3) to activate the real-time PN generator 370. Also as previously discussed, the searcher timing unit 142 is activated by applying a clock signal.

At block 712 the PN sequence start state is read from the PN sequence awake state register 360 (FIG. 3) and loaded into the real-time PN generator 370 to establish a timing reference. Loading the PN sequence start comprises loading a 15-bit start state of the in-phase and quadrature-phase PN sequence into the real-time LSG 310 (FIG. 3), initializing the 15-bit state of the real-time PN roll counter 312 (FIG. 3), and initializing the real-time position counter 314 (FIG. 3).

As discussed previously, the real-time position counter 314 is used at a later stage of activation and changes state whenever the real-time PN generator 370 is slewed. For example, if the real-time PN generator 370 is slewed by four chips, the real-time position counter 314 will track that. The slew control is applied on line 308, and the state or value of the real-time position counter 314 is held constant when the real-time PN generator 370 is not slewed.

At block 716 (FIG. 7) the real-time PN generator 370 starts to generate a PN sequence at a first rate to increment the PN sequence real-time state at the chip rate to generate I and Q samples of the PN sequence. At block 720 (FIG. 7) the real-time PN roll counter 312 increments at the first rate in unison with the generation of the PN sequence.

At block 724 the radiotelephone 104 receives signals transmitted by base station 102. During this time the microprocessor 117 controls various functions of the radiotelephone 104.

At a finite amount of time later, the microprocessor 117 generates a start search command at block 726, and at block 728 (FIG. 7), as the PN generator 370 is generating the PN sequence, the ADC 110 (FIG. 2) receives a transmitted analog signal from the analog front end 108 and converts the analog signal to digital samples that are applied to an in-phase (I) input 212 and a quadrature-phase (Q) input 214 (FIG. 3). A delayed version of the digital samples, comprising the digital samples delayed by one-half of a chip duration, is produced by delay circuit 220. The digital samples and the delayed versions of the digital samples are stored in the receiver sample buffer 230 in correspondence (e.g. in unison) to the PN generator 370 generating the PN sequence.

At block 729, as the very first I and Q samples are written into the receiver sample buffer 230, the PN state of the real-time PN generator 370 at this instance in time is noted and loaded into the initial PN state register 318. This references the stored samples to the PN sequence generated by the real-time PN generator 370.

After the receiver sample buffer 230 (FIG. 3) is filled, the multiplexer 238 (FIG. 3) is switched from the chip clock signal present at input 232 to the high-speed clock signal present at second input 234 (FIG. 3) at block 730 (FIG. 7). Now substantially all of the circuitry of the searcher receiver 114 (FIGS. 2 and 3) except for the real-time PN generator 370 operates at the higher speed of the high-speed clock signal.

At block 732 (FIG. 7) the microprocessor 117 (FIG. 2) sets the window size to full (e.g. $2^{15}$), which prepares the searcher receiver to correlate over the entire PN sequence space (e.g. $2^{15}$ different offsets) with the stored samples. At block 734 (FIG. 7) the high-speed PN generator 372 (FIG. 3) is initialized with the PN state stored in the initial PN state register 318, and at block 736 (FIG. 7) the first correlation is started.

At the beginning of the correlation, when the high-speed PN generator 372 (FIG. 3) has incremented one chip in the PN sequence at block 738, that state is stored into the next-PN-state register 340. This will be used as the starting point for the next set of correlations within the predetermined window size. The next starting point is advanced a whole chip from the initial PN state because a half chip increment is already correlated with the delayed versions of the digital samples.

As described previously, the two-phase correlator 202 (FIG. 3) correlates the samples in the receiver sample buffer 230 with the PN sequence generated from the high-speed PN generator 372 to produce a correlation result. The sums generated in first accumulator 274 and second accumulator 276 are applied to the latch and scale circuit 284 (FIG. 3).

The latch and scale circuit 284 is used to latch intermediate correlation results and full correlation results to perform energy calculations. For example, an intermediate correlation result can be selected to correspond to a correlation of the first 64 chip samples, and a full correlation result can correspond to 1024 chips. Other intermediate and full correlation lengths can be chosen.

Thus, at block 740 when the first 64 chips are accumulated at the two-phase correlator 202, the accumulated value is latched and an intermediate energy is calculated and compared to an intermediate energy threshold (also referred to as an early threshold energy) present at threshold input 295 (FIG. 3) of energy post-processor 206 (FIG. 3). Thus, for a particular PN offset a first correlation is performed over a first portion of the samples. An intermediate energy calculation is performed to determine if the offset presently used for the high-speed correlation is producing a suitably high energy result.

If at decision block 744 the intermediate correlation energy is below the intermediate energy threshold, the correlation at that particular offset is abandoned. Then, if at decision block 770 the full window size has not been analyzed (e.g. correlations at all $2^{15}$ offsets), the process continues at block 734. The high-speed PN generator 372 (FIG. 3) is initialized with the next PN state from the next-PN-state register 340 (FIG. 3). Once again, when the high-speed PN generator 372 (FIG. 3) has incremented one chip in the PN sequence at block 738, that state is stored into the next-PN-state register 340. This will be used as the starting point for the next set of correlations within the window.

If at decision block 744 the intermediate correlation energy is above the intermediate energy threshold, then at block 746 the two-phase correlator 202 (FIG. 3) is unlatched and the rest of the samples for that PN offset are despread and accumulated via the two-phase correlator 202 for the prescribed accumulation length (e.g. a full correlation is performed). When all of the chips are accumulated at the two-phase correlator 202, the accumulated value is latched and an full correlation energy is calculated. Thus, for a particular PN offset, a second correlation is performed over a second portion of the samples. The second portion of the samples corresponding to a full correlation is greater than the first portion of samples corresponding to the intermediate correlation.

If at decision block 750 the full correlation energy is less than all of the energies stored in the storage locations of the searcher output buffer 208 (FIG. 3), the process continues at decision block 770. Once again, if the full window size has not been analyzed (e.g. correlations at all $2^{15}$ offsets), the process continues at block 734 where the high-speed PN generator 372 (FIG. 3) is initialized with the next PN state from the next-PN-state register 340 (FIG. 3).

If at decision block 750 the full correlation energy is greater than any of the energies stored in the storage locations of the searcher output buffer 208 (FIG. 3), the process continues at decision block 754. If at decision block 754 the full correlation energy exceeds a full correlation energy threshold present at threshold input 295 of the energy post-processor 206 (FIG. 3), then at block 758 the microprocessor 117 (FIG. 2) asserts high an energy indicator bit associated with that full correlation energy value (the full correlation energy threshold is greater than the intermediate energy threshold). At block 762 the full correlation energy value along with its associated energy indicator bit is applied through line 296 (FIG. 3) to the searcher output buffer 208 (FIG. 3) and stored in one of the storage locations. The process continues at decision block 766.

If at decision block 754 the full correlation energy does not exceed the full correlation energy threshold, then the full correlation energy value along with an associated asserted low energy bit is stored in one of the storage locations of the searcher output buffer 208, and the process continues at block 766.

At decision block 766, if the particular full correlation energy exceeds an acquisition threshold energy (the acquisition threshold energy greater than the full threshold energy), a suitable pilot signal ray and PN sequence timing have been identified, and the process continues at block 636 of FIG. 6. Thus, once a hypothesized PN sequence timing/offset produces a full correlation energy above the acquisition energy threshold, the microprocessor 117 interrupts the search process to assign the PN sequence timing to at least one demodulation branch. However, if at decision block 766 the full correlation energy at the particular offset does not at least equal the acquisition threshold energy, the process continues at decision block 770.

Once again, if at decision block 770 the full window size has not been analyzed (e.g. correlations at all $2^{15}$ offsets), the process continues at block 734 where the high-speed PN generator 372 (FIG. 3) is initialized with the next PN state from the next-PN-state register 340 (FIG. 3). If at decision block 77 the full window size has been analyzed, then at block 774 the microprocessor 117 interrupts the analysis and picks the PN offset associated with the highest full correlation energy stored in the storage locations of the searcher output buffer 208. The microprocessor 117 then sends instructions to assign the PN sequence timing to at least one demodulation branch. The searcher receiver can then receive new digital samples to search for better pilot signals and associated PN sequence timing while demodulation with the at least one demodulation branch occurs.

By interrupting the correlation analysis when the acquisition threshold energy is first exceeded instead of waiting until all of the offsets in the window size have been analyzed, the acquisition time is significantly reduced, which is beneficial to users. In addition, radiotelephone current drain is minimized, microprocessor required interaction in pilot signal searching and acquisition is minimized, and flexibility for MAHHO is increased.

The previous description of the preferred embodiments are provided to enable any person skilled in the art to practice the preferred embodiments. Various modifications to these embodiments will be readily apparent to those skilled in the art, and the generic principles defined herein may be applied to other embodiments without the use of the inventive faculty. For example, the preferred embodiments have been described in conjunction with the IS-95 CDMA cellular telephone system. The preferred embodiments are equally applicable to other types of spread-spectrum cellular telephone systems, such as multi-carrier CDMA systems and third generation wide-band CDMA systems.

Further, FIG. 7 shows an early threshold analysis, an full threshold analysis, and an acquisition threshold analysis. In alternate embodiments, less threshold energies can be employed. For example, the acquisition threshold energy can be equal to the full threshold energy. Still further, the steps associated with an early threshold analysis can be skipped.

We claim:

1. In a radiotelephone operable in a code division multiple access (CDMA) system, a method of acquiring a pilot signal, the method comprising:

storing samples of a received signal;

generating, during the step storing, a PN sequence;

selecting a pseudo-random noise (PN) offset for a PN sequence;

correlating at least a portion of the samples with at least a portion of the PN sequence to produce a correlation energy;

choosing a new PN offset;

comparing the correlation energy to an energy threshold; and repeating the steps of correlating, choosing, and comparing until any of:

a PN sequence timing is found that produces the correlation energy at least equal to the energy threshold, or the step of comparing is performed a predetermined number of times; and wherein during the step of correlating, the PN sequence is re-generated with reference to the PN offset at a faster rate than the step of generating.

2. The method as in claim 1 wherein the step of choosing is responsive to the step of correlating.

3. The method as in claim 1 further comprising noting, during the step of storing, a position of the PN sequence.

4. The method as in claim 3 wherein the step of selecting is responsive to the step of noting.

5. The method as in claim 3 wherein the new PN offset is chosen with respect to the PN offset selected during the step of selecting.

6. The method as in claim 5 wherein the new PN offset represents an incremented version of the PN offset selected during the step of selecting.

7. A method of activating a radiotelephone operable in a code division multiple access (CDMA) system, the method comprising the steps of:

activating at least a portion of a searcher receiver;

initiating the generation of a pseudo-random noise (PN) sequence;

storing samples of a received signal;

noting, during the step of storing, a position of the PN sequence;

producing, responsive to the step of noting, a reference position of the PN sequence;

re-generating the PN sequence using the reference position;

correlating, during the step of re-generating, at least a portion of the samples with at least a portion of the PN sequence to produce a correlation energy;

incrementing, responsive to the step of regenerating, the reference position;

comparing the correlation energy to an energy threshold; and repeating the steps of regenerating, correlating, incrementing, and comparing until any of:
   a PN sequence timing is found that produces the correlation energy at least equal to the energy threshold, or
   the step of comparing is performed a predetermined number of times.

8. The method as in claim 7 wherein the steps of storing, noting, and producing occur at a first rate, and the steps of regenerating, correlating, incrementing, and comparing occur at a second rate, the second rate faster than the first rate.

9. The method as in claim 8 further comprising:
   ranking each of the correlation energies as they are produced; and
   storing a predetermined number of highest correlation energies and the corresponding reference positions of the PN sequence.

10. The method as in claim 7 further comprising assigning, to at least one demodulation branch of a receiver of the radiotelephone, a PN sequence timing corresponding to the reference position that produces the correlation energy at least equal to the energy threshold.

11. In a code division multiple access (CDMA) radiotelephone, a method of acquiring a pilot signal, the method comprising:
   storing a predetermined number of a plurality of samples of a received signal;
   generating a pseudo-random noise (PN) sequence at each of a plurality of different PN offsets;
   correlating the samples from the same stored predetermined number of samples with the PN sequence at each of the plurality of different PN offsets to produce corresponding correlation energies at a faster rate than the step of storing;
   interrupting the correlating when a correlation energy at least equal to a predetermined threshold is produced; and
   choosing a PN sequence timing based upon the PN sequence and a PN offset that produces a full correlation energy at least equal to the predetermined threshold.

12. The method as in claim 11 wherein the step of choosing is responsive to the step of interrupting.

13. The method as in claim 11 further comprising assigning, responsive to the step of choosing, the PN sequence timing to at least one demodulation branch of a receiver of the radiotelephone.

14. In a code division multiple access (CDMA) radiotelephone, a method of acquiring a pilot signal, the method comprising:
   storing a predetermined number of samples of a received signal;
   generating a pseudo-random noise (PN) sequence at each of a plurality of different PN offsets;
   correlating the predetermined number of samples with the PN sequence at each of the plurality of different PN offsets to produce corresponding correlation energies, including
      a first correlation involving a first portion of the samples and a first portion of the PN sequence, and
      a second correlation involving a second portion of the samples and a second portion of the PN sequence,
      wherein if during the step of correlating the first correlation produces an intermediate correlation energy less than an intermediate threshold for a particular PN offset, the second correlation at that particular PN offset is not performed;
   interrupting the correlating when a correlation energy at least equal to a predetermined threshold is produced; and
   choosing a PN sequence timing based upon the PN sequence and a PN offset that produces a full correlation energy at least equal to the predetermined threshold.

15. An apparatus for acquiring a pseudo-random (PN) sequence timing for a code division multiple access (CDMA) radiotelephone, the apparatus comprising:
   a buffer to store a plurality of samples of a received signal;
   a correlator coupled to the buffer and operable to correlate at least a portion of the same stored samples with a PN sequence at each of a plurality of different PN offsets to produce corresponding correlation energies;
   a controller coupled to the correlator and operable to interrupt the correlator from correlating portions of the samples with further PN sequences of different PN offsets, when the PN sequence at a particular PN offset produces a correlation energy at least equal to an energy threshold; and
   a memory coupled to the correlator for storing a predetermined number of highest correlation energies and corresponding PN offsets; and
   wherein if after a predetermined number of correlations none of the produced correlation energies at least equal the energy threshold, the controller chooses from the memory a PN offset corresponding to a highest correlation energy.

16. The apparatus as in claim 15 wherein the controller comprises any of a microprocessor, a digital signal processor (DSP), and logic circuitry.

17. The apparatus as in claim 15 further comprising a latch coupled to an output of the correlator and operable, at each of the plurality of different PN offsets, to latch an intermediate correlation result after correlation over a first number of the samples and operable to latch a second correlation result after correlation over a second number of the samples.

18. The apparatus as in claim 15 further comprising a PN sequence generator coupled to the buffer and the correlator to generate the PN sequence at each of the plurality of different PN offsets.

19. The apparatus as in claim 18 wherein the PN sequence generator comprises a first PN generator and a second PN generator, the first PN generator operable to generate a PN sequence at a first rate to store the samples in the buffer, the second PN generator operable to generate the PN sequence at each of the plurality of different PN offsets at a second rate, the second rate faster than the first rate.

20. A code division multiple access (CDMA) cellular telephone system comprising:
   at least one base station for transmitting a pilot signal having a particular time alignment;

a cellular telephone operable to receive representations of the pilot signal, the cellular telephone including:
a buffer to store a plurality of samples of the representations of the pilot signal;
a correlator coupled to the buffer and operable to correlate at least a portion of the same stored samples with a pseudo-random noise (PN) sequence at each of a plurality of different PN offsets to produce corresponding correlation energies;
a controller coupled to the correlator and operable to interrupt the correlator from correlating portions of the samples with further PN sequences of different PN offsets, when the PN sequence at a particular PN offset produces a correlation energy at least equal to an energy threshold; and
a memory coupled to the correlator for storing a predetermined number of highest correlation energies and corresponding PN offsets; and
wherein if after a determined number of correlations none of the produced correlation energies at least equal the energy threshold, the controller chooses from the memory a PN offset corresponding to a highest correlation energy.

21. The CDMA cellular telephone system as in claim 20 wherein the controller comprises any of a microprocessor, a digital signal processor (DSP), and logic circuitry.

22. The CDMA cellular telephone system as in claim 20 further comprising a latch coupled to an output of the correlator and operable, at each of the plurality of different PN offsets, to latch an intermediate correlation result after correlation over a first number of the samples and operable to latch a second correlation result after correlation over a second number of the samples.

23. The CDMA cellular telephone system as in claim 20 further comprising a PN sequence generator coupled to the buffer and the correlator to generate the PN sequence at each of the plurality of different PN offsets.

24. The CDMA cellular telephone system as in claim 23 wherein the PN sequence generator comprises a first PN generator and a second PN generator, the first PN generator operable to generate a PN sequence at a first rate to store the samples in the buffer, the second PN generator operable to generate the PN sequence at each of the plurality of different PN offsets at a second rate, the second rate faster than the first rate.

25. A method of activating a code division multiple access (CDMA) cellular telephone, the method comprising:
turning on the cellular telephone;
activating a searcher receiver;
receiving representations of a pilot signal;
generating a pseudo-random noise (PN) sequence;
storing, during the step of generating, digital samples of the representations of the pilot signal;
re-generating the PN sequence at each of a plurality of PN offsets;
correlating the digital samples with the PN sequence at each of the plurality of PN offsets to produce corresponding single correlation energies;
storing a predetermined number of highest single correlation energies and corresponding PN offsets;
comparing after each correlation each of the single correlation energies to an energy threshold;
suspending the step of correlating responsive to finding a particular PN offset producing a single correlation energy at least equal to the energy threshold and using the particular PN offset as a PN sequence timing of a demodulation branch in a receiver of the cellular telephone; and if, after the step of correlating is performed a predetermined number of times without producing the single correlation energy at least equal to the energy threshold, then choosing a PN offset corresponding to a highest stored single correlation energy for the PN sequence timing.

26. In a radiotelephone operable in a code division multiple access (CDMA) system, a method of acquiring a pilot signal, the method comprising:
(a) generating a pseudo-random noise (PN) sequence at a first rate;
(b) storing samples of a received signal at the first rate;
(c) nothing, during the step of storing, a reference position of the PN sequence;
(d) storing the reference position;
(e) re-generating at a second rate the PN sequence starting from the reference position, the second rate faster than the first rate;
(f) correlating, during the step or re-generating, at least a portion of the samples with at least a portion of the PN sequence to produce a correlation energy;
(g) selecting, responsive to the step of re-generating, a new reference position;
(h) comparing the correlation energy to an energy threshold; and
(i) repeating steps (e) through (h) until any of:
a correlation results in the correlation energy at least equal to the energy threshold, wherein a reference position corresponding to the correlation energy at least equal to the energy threshold is assigned to at least one demodulation branch of a receiver of the radiotelephone, or
the step of comparing is performed a predetermined number of times, wherein a reference position corresponding to a highest correlation energy is assigned to the at least one demodulation branch.

27. In a radiotelephone operable in a code division multiple access (CDMA) telephone system, a receiver circuit for acquiring a pseudo-random noise (PN) sequence timing, the receiver circuit comprising:
a buffer to store samples of representations of at least one pilot signal;
a first PN generator coupled to the buffer to produce a PN sequence at a first rate;
a second PN generator coupled to the buffer to produce the PN sequence at a plurality of PN offsets at a second rate, the second rate faster than the first rate;
a correlator coupled to the buffer and operable to correlate at least a portion of the samples with the PN sequence at each of the plurality of PN offsets to produce a correlation energy for each correlation;
a comparator coupled to the correlator to compare each of the correlation energies to an energy threshold; and
an energy post-processor coupled to the comparator and operable to note a highest correlation energy;
wherein responsive to a particular PN offset resulting in a correlation energy at least equal to an energy threshold, the correlator suspends correlating and the particular PN offset is useful as a PN sequence timing, and
wherein responsive to the correlator performing a predetermined number of correlations and none of the plurality of PN offsets results in the correlation energy at least equal to the energy threshold, a PN offset corresponding to the highest correlation energy is selected as the PN sequence timing.

* * * * *